(12) United States Patent
Harris et al.

(10) Patent No.: US 12,533,938 B2
(45) Date of Patent: Jan. 27, 2026

(54) HIGH STRENGTH STEEL TUBE REINFORCEMENT OF ALUMINUM BATTERY CASE

(71) Applicant: TOYOTA MOTOR ENGINEERING & MANUFACTURING NORTH AMERICA, INC., Plano, TX (US)

(72) Inventors: Ryan C. Harris, Saline, MI (US); Kaitlyn A. Cherniuk, Ypsilanti, MI (US); Weiling Wang, Livonia, MI (US); Todd Muck, Fowlerville, MI (US)

(73) Assignees: TOYOTA MOTOR ENGINEERING & MANUFACTURING NORTH AMERICA, INC., Plano, TX (US); TOYOTA JIDOSHA KABUSHIKI KAISHA, Toyota (JP)

( * ) Notice: Subject to any disclaimer, the term of this patent is extended or adjusted under 35 U.S.C. 154(b) by 330 days.

(21) Appl. No.: 18/311,078

(22) Filed: May 2, 2023

(65) Prior Publication Data

US 2024/0367498 A1    Nov. 7, 2024

(51) Int. Cl.
*B60K 1/04* (2019.01)
*H01M 50/224* (2021.01)
*H01M 50/249* (2021.01)
*H01M 50/262* (2021.01)

(52) U.S. Cl.
CPC ............. *B60K 1/04* (2013.01); *H01M 50/224* (2021.01); *H01M 50/249* (2021.01); *H01M 50/262* (2021.01); *H01M 2220/20* (2013.01)

(58) Field of Classification Search
CPC .. B60K 1/04; H01M 50/262; H01M 2220/20; H01M 10/613
See application file for complete search history.

(56) References Cited

U.S. PATENT DOCUMENTS

| | | | |
|---|---|---|---|
| 10,220,882 B2* | 3/2019 | Ayukawa | B62D 25/025 |
| 10,259,506 B2 | 4/2019 | Ayukawa | |
| 10,632,827 B2* | 4/2020 | Ajisaka | B62D 25/2018 |
| 11,318,995 B2* | 5/2022 | Charbonneau | B62D 21/157 |
| 2011/0104532 A1* | 5/2011 | Buck | H01M 50/325 |
| | | | 429/82 |
| 2012/0021270 A1* | 1/2012 | Kumar | H01M 10/6566 |
| | | | 429/120 |
| 2014/0023906 A1* | 1/2014 | Hashimoto | H01M 10/625 |
| | | | 429/157 |

(Continued)

FOREIGN PATENT DOCUMENTS

| | | |
|---|---|---|
| KR | 102344152 B1 | 1/2022 |
| KR | 20220136715 A | 10/2022 |

*Primary Examiner* — Erez Gurari
(74) *Attorney, Agent, or Firm* — SHEPPARD, MULLIN, RICHTER & HAMPTON LLP; Daniel N. Yannuzzi

(57) ABSTRACT

Systems and methods are provided securing a battery pack to a vehicle. Embodiments can comprise an internal cross member secured to a first side of the vehicle's chassis. A cooling plate can be placed on one side of the internal cross member opposite to the first side of the vehicle's chassis where the internal cross member is secured. A hat-shaped section can extend at least partially across a width of the vehicle and secured to a second side of the vehicle's chassis. A structural reinforcement member can partially surround a battery pack of the vehicle.

10 Claims, 3 Drawing Sheets

(56) References Cited

U.S. PATENT DOCUMENTS

| | | | |
|---|---|---|---|
| 2014/0205882 A1* | 7/2014 | Kepler | H01M 10/613 |
| | | | 429/120 |
| 2014/0333238 A1* | 11/2014 | Yokoyama | H01M 50/244 |
| | | | 318/139 |
| 2014/0333239 A1* | 11/2014 | Yokoyama | E02F 9/0858 |
| | | | 318/139 |
| 2025/0079605 A1* | 3/2025 | Wu | H01M 10/61 |
| 2025/0135866 A1* | 5/2025 | Liu | H01M 50/262 |

* cited by examiner

HIGH STRENGTH STEEL TUBE REINFORCEMENT OF ALUMINUM BATTERY CASE

TECHNICAL FIELD

The present disclosure relates generally to the reinforcement and structure of automotive battery packs. In particular, some embodiments are directed towards reinforcement members used to secure battery packs to the chassis frame.

DESCRIPTION OF RELATED ART

Traditional automotive battery pack structures are aluminum, standard structures for use in multiple models. Many battery pack structures in production contain structural members either within the battery pack or below the battery pack to prevent damage to the battery cells in a crash event. In some vehicles, the battery structure requires a higher strength than a standard structure due to the higher weight and height of vehicle.

BRIEF SUMMARY OF THE DISCLOSURE

According to various embodiments of the disclosed technology, a system for securing a battery pack to a vehicle can comprise an internal cross member secured to a first side of the vehicle's chassis; a cooling plate placed on one side of the internal cross member opposite to the first side of the vehicle's chassis where the internal cross member is secured; a hat-shaped section extending at least partially across a width of the vehicle and secured to a second side of the vehicle's chassis, wherein the first side is opposite the second side; and a structural reinforcement member at least partially surrounding a battery pack of the vehicle, wherein the structural reinforcement member and the battery pack are positioned within the hat-shaped section.

In some embodiments, the hat-shaped section comprises an aluminum structure, and wherein the structural reinforcement member comprises a steel structure.

In some embodiments, the system further comprises a protection plate, wherein the structural reinforcement member is secured to the protection plate.

In some embodiments, the structural reinforcement member is nested between the protection plate and the vehicle's chassis.

In some embodiments, the hat-shaped section is fixed to the protection plate.

In some embodiments, the system further comprises a side frame extending from a bottom of the vehicle to a top of the vehicle, wherein the structural reinforcement member is positioned between the protection plate and the side frame.

In some embodiments, the cooling plate is positioned between the internal cross member and the hat-shaped section.

In some embodiments, the internal cross member comprises a base portion, wherein the base portion's length matches a length of the hat-shaped section.

In some embodiments, the hat-shaped section and the structural reinforcement member are secured using a rivet nut.

In some embodiments, the hat-shaped section tightly surrounds the structural reinforcement member on three sides.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

The figures are not exhaustive and do not limit the present disclosure to the precise form disclosed.

DETAILED DESCRIPTION

Embodiments of the systems and methods disclosed herein can add a structural reinforcement member to the battery pack structure of a vehicle. Battery packs need to be secure in a vehicle, as enough movement can separate the battery pack from the necessary circuits. Vehicles apply battery pack structures to provide some stability to the battery pack. Traditional battery pack structures can comprise one or more aluminum components to secure the battery pack. These structures can take various shapes. In some examples, battery modules are mounted to a tray with fasteners. This tray can comprise a component of the vehicle body. In other examples, battery modules can be fastened to the vehicle body using metal brackets. As with the tray, these brackets would be fastened to the vehicle body with bolts or other fasteners. Both of these example structures may not be sufficient depending on the vehicle. As a vehicle increases in weight and height, the battery pack will need to be secured with additional strength to prevent undesired movement of the battery pack. Mere fasteners would not sufficiently secure a battery pack when subjected to the force arising from the weight of the vehicle.

The embodiments described herein add a structural reinforcement member that is secured to the chassis frame and the side frame of the battery pack. The addition of this structural member can provide additional rigidity and strength to the battery pack structure to withstand great forces. In particular, a battery pack can be positioned between a pair of side chassis frame members. The battery pack can include a side frame, a cooling plate, a protection plate, a hat shaped aluminum extruded section, and a structural steel reinforcement member. The addition of these chassis frame members can further secure the battery pack to the chassis beyond mere fasteners. Because the frame members are secured to the chassis, the battery pack can withstand greater forces due to the relevant movement and rigidity of the frame members.

Figure 1:
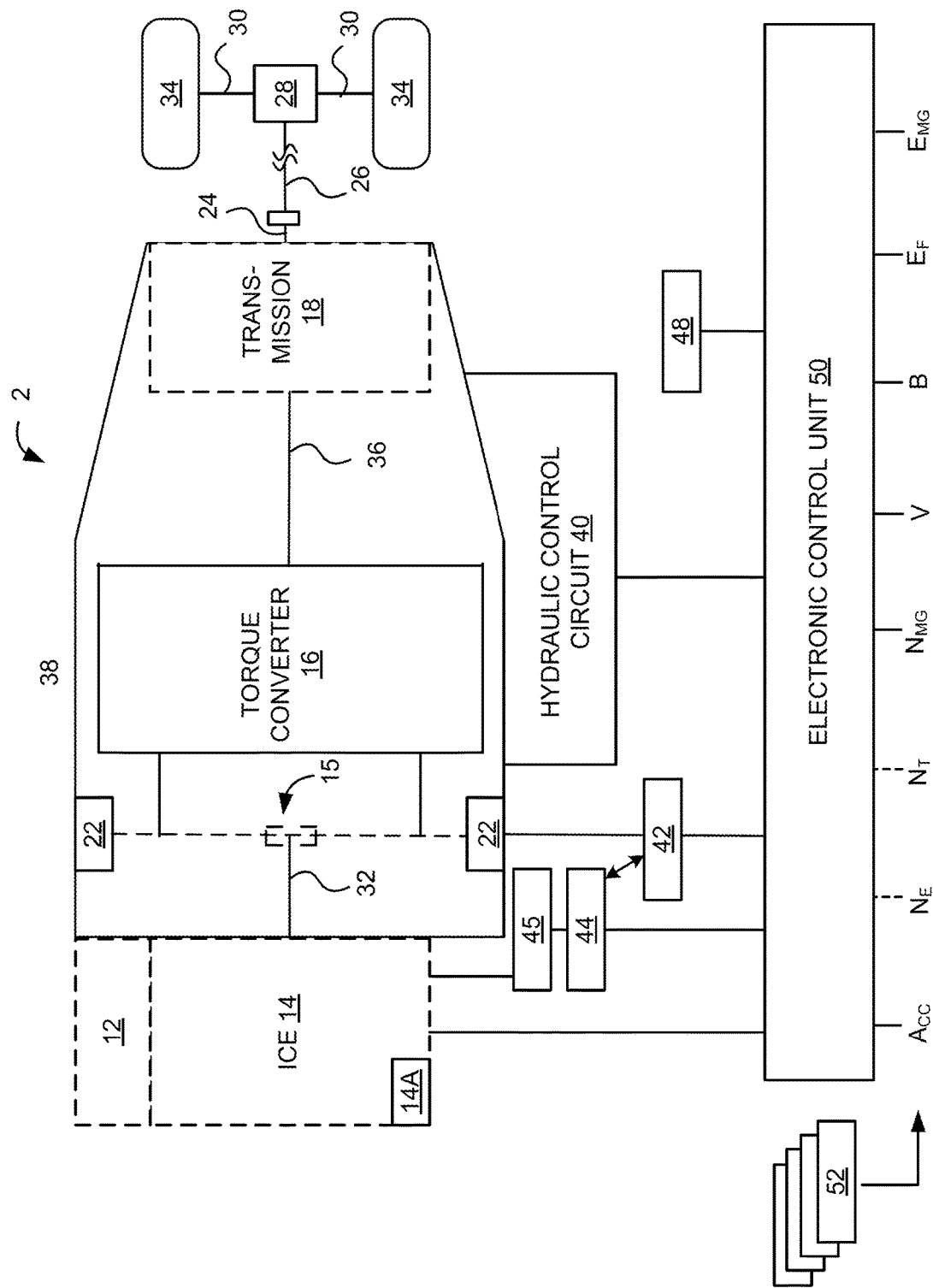
FIG. 1 is a schematic representation of an example hybrid vehicle with which embodiments of the systems and methods disclosed herein may be implemented.

The systems and methods disclosed herein may be implemented with any of a number of different vehicles and vehicle types. For example, the systems and methods disclosed herein may be used with automobiles, trucks, motorcycles, recreational vehicles and other like on-or off-road vehicles. In addition, the principals disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the system for reinforcing a battery case can be implemented in other types of vehicle including gasoline- or diesel-powered vehicles, fuel-cell vehicles, electric vehicles, or other vehicles.

FIG. 1 illustrates a drive system of a vehicle 100 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 100 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, nickel-metal hydride batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 100 may include an electronic control unit 50. Electronic control unit 50 may include circuitry to control various aspects of the vehicle operation.

Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 100. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 100 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
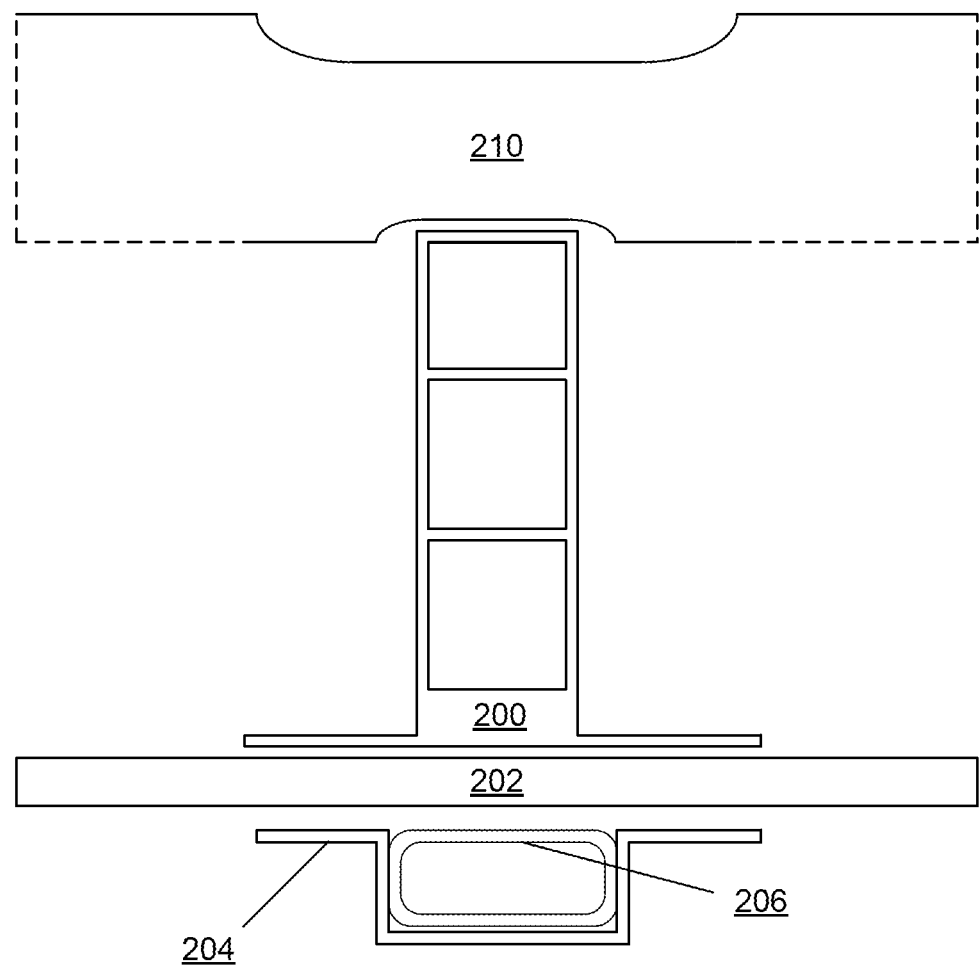
FIG. 2 illustrates a first view of a vehicle implementing the systems described herein.

FIG. 2 illustrates an example top-down view of a vehicle implementing a reinforced battery pack structure. Internal cross member 200 can be secured across the width of the vehicle. Internal cross member can comprise any material, such as steel, aluminum, or any material used for the chassis frame. Internal cross member can be rectangular and characterized by a ladder design including a longer base portion. The gaps in internal cross member 200 can be rectangular and spaced evenly across the cross member. Internal cross member 200 can include one or more gaps, or comprise solid material for additional strength. Internal cross member 200 can support the internal combustion engine of the vehicle and/or transmission 18 as described above in FIG. 1. Attached to internal cross member 200 is cooling plate 202. Cooling plate 202 can comprise any cooling plate to maintain the battery back. Internal cross member 200 can be secured in between one side of chassis frame 210 and cooling plate 202 on the other side. Cooling plate 202 may be rectangular in shape and comprise a length to span past the length of the battery pack and its corresponding supports. Cooling plate 202 can be longer than the base portion of internal cross member 200.

Next to cooling plate 202 can be support section 204. Support section 204 can comprise a hat-shaped extruded section with a corresponding gap to house the battery pack. Support section 204 can surround the battery pack on all sides except the side closest to the cooling plate. Support section 204 can be made out of aluminum or any other material to contain the battery pack. Support section 204 can extend across the vehicle length on a longer side to coincide with the length of the base portion of internal cross member 200. The shorter side of support section 204 can correspond to the length of the battery pack. Cooling plate 202 can be nested inbetween internal cross member 200 and support section 204. There may be space between cooling plate 202 and support section 204, or support section 204 can make contact with cooling plate 202. Support section 204's hat shape can extend in the vehicle width direction to fully surround the battery pack on three sides. The width of support section 204's hat shape can stop short of the battery pack side frame and the chassis frame.

Structural steel reinforcement member 206 can be nested in support section 204. This member can surround the battery pack and tightly contain the battery pack. Structural steel reinforcement member 206 can tightly fit inside support section 204 such that there is no space between them. In the example of FIG. 2, structural steel reinforcement member 206 can be rectangular with rounded edges; however, this member can be configured to surround various battery pack sizes as needed. This configuration can provide additional rigidity to the battery pack structure. Support section 204 and structural steel reinforcement member 206 can be secured to the chassis frame and the side frame of the battery pack. These support structures can be secured by any means, including through welding, fasteners, adhesives, or other means to reduce support section 204's movement.

Figure 3:
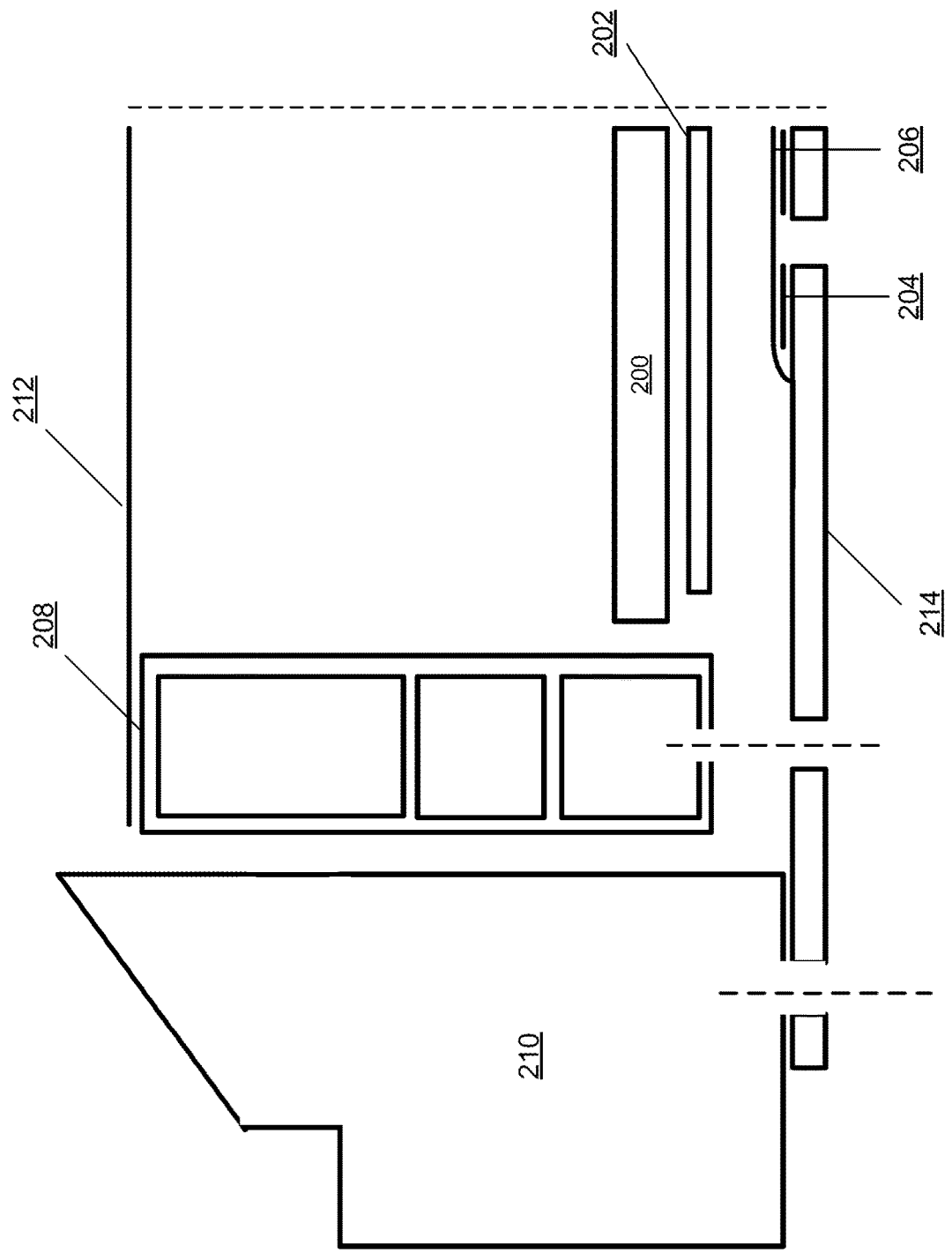
FIG. 3 illustrates a second view of a vehicle implementing the systems described herein.

FIG. 3 illustrates an example side view of the vehicle described above in FIG. 2. Here, a central portion of support section 204 and structural reinforcement member 206 are positioned between a protection plate 214 and cooling plate 202. Protection plate 214 can comprise a metal plate on the bottom side of the vehicle chassis to secure support section 204 to the bottom of the chassis frame. Support section 204 can be secured to protection plate 214, which, in turn, is secured to the chassis frame. Structural reinforcement member 206 can also be crimped, sandwiched between, and secured to protection plate 214 and the side of chassis frame 210.

A side frame 208 can extend along the height of the vehicle in between the side chassis frame 210 and the internal cross member. Side frame 208 may comprise a rectangular structure with one or more gaps. Side frame 208 may be positioned between protection plate 214 and cover plate 212. Cover plate 212 may span the battery support structure in a top-down perspective. Cover plate 212 may comprise any flat metal plate positioned above side frame 208. Structural reinforcement member 206 can be positioned between protection plate 214 and side frame 208. At an end portion, structural reinforcement member 206 can be crimped between chassis frame 210 and protection plate 214. In some embodiments, structural reinforcement member 206 and support section 204 can be secured using a rivet nut. As mentioned above, various fastening methods can be used to secure various portions of the battery support structure.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A system for securing a battery pack to a vehicle comprising:
    an internal cross member secured to a first side of the vehicle's chassis;
    a cooling plate placed on one side of the internal cross member opposite to the first side of the vehicle's chassis where the internal cross member is secured;
    a hat-shaped section extending at least partially across a width of the vehicle and secured to a second side of the vehicle's chassis, wherein the first side is opposite the second side, and wherein the hat-shaped section comprises a hollow, elongated member open at a first end, and closed at a second end opposite from the first end; and
    a structural reinforcement member at least partially surrounding a battery pack of the vehicle, wherein the structural reinforcement member and the battery pack are positioned within the hat-shaped section.

2. The system of claim 1, wherein the hat-shaped section comprises an aluminum structure, and wherein the structural reinforcement member comprises a steel structure.

3. The system of claim 1, further comprising a protection plate, wherein the structural reinforcement member is secured to the protection plate.

4. The system of claim 3, wherein the structural reinforcement member is nested between the protection plate and the vehicle's chassis.

5. The system of claim 3, wherein the hat-shaped section is fixed to the protection plate.

6. The system of claim 3, further comprising a side frame extending from a bottom of the vehicle to a top of the vehicle, wherein the structural reinforcement member is positioned between the protection plate and the side frame.

7. The system of claim 1, wherein the cooling plate is positioned between the internal cross member and the hat-shaped section.

8. The system of claim 1, wherein the internal cross member comprises a base portion, wherein the base portion's length matches a length of the hat-shaped section.

9. The system of claim 1, wherein the hat-shaped section and the structural reinforcement member are secured using a rivet nut.

10. The system of claim 1, wherein the hat-shaped section tightly surrounds the structural reinforcement member on three sides.

* * * * *